US006415164B1

(12) United States Patent
Blanchard et al.

(10) Patent No.: US 6,415,164 B1
(45) Date of Patent: Jul. 2, 2002

(54) ARRANGEMENT FOR DYNAMIC ALLOCATION OF SPACE ON A SMALL DISPLAY OF A TELEPHONE TERMINAL

(75) Inventors: Harry Edward Blanchard, Rumson; Kathleen J. Chylinski, Bridgewater; David R. Dempski, Bricktown; Steven M. Herbst, Chester; Nicholas H. Katis, Aberdeen; Susan A. Palermo, Oceanport; Susan L. Tuttle, East Windsor, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/271,036

(22) Filed: Mar. 17, 1999

Related U.S. Application Data

(63) Continuation of application No. 08/775,316, filed on Dec. 31, 1996.

(51) Int. Cl.[7] .............................. H04B 1/38; H04B 1/18; H04M 1/00
(52) U.S. Cl. ............... 455/566; 455/158.4; 379/387.01; 379/93.17
(58) Field of Search ................................ 379/355, 457, 379/387.01, 354, 93.17; 455/575, 145, 158.4, 566, 564, 550, 412, 414, 90; 345/146, 173, 333, 353, 352, 356, 357, 661, 810, 848

(56) References Cited

U.S. PATENT DOCUMENTS

| | | | |
|---|---|---|---|
| 5,371,788 A | * 12/1994 | Baals et al. ................. 379/396 |
| 5,373,551 A | * 12/1994 | Baals et al. ................. 379/457 |
| 5,392,337 A | * 2/1995 | Baals et al. ................. 379/457 |
| 5,412,713 A | * 5/1995 | Baals et al. ................. 379/457 |
| 5,543,781 A | * 8/1996 | Gancheau, Jr. et al. .. 340/825.44 |
| 5,552,806 A | * 9/1996 | Lenchik ..................... 345/156 |
| 5,657,378 A | * 8/1997 | Haddock et al. ......... 379/93.23 |
| 5,705,995 A | * 1/1998 | Laflin et al. ............. 340/825.44 |
| 5,737,394 A | * 4/1998 | Anderson et al. ........ 379/88.11 |
| 5,761,610 A | * 6/1998 | Sorensen et al. ............. 455/89 |
| 5,774,540 A | * 6/1998 | Davidson et al. ........... 379/387 |
| 5,809,415 A | * 9/1998 | Rossmann .................. 455/422 |
| 5,890,053 A | * 3/1999 | Hino et al. .............. 455/186.1 |
| 6,021,193 A | * 2/2000 | Thomas ..................... 379/387 |
| 6,125,287 A | * 9/2000 | Cushman et al. ........... 455/566 |
| 6,145,569 A1 | * 2/2001 | Frederiksen ................ 455/566 |

FOREIGN PATENT DOCUMENTS

JP  10136067  * 5/1998

* cited by examiner

*Primary Examiner*—Vivian Chin
*Assistant Examiner*—Charles N. Appiah
(74) *Attorney, Agent, or Firm*—Priest & Goldstein, PLLC

(57) ABSTRACT

An arrangement for dynamically varying how space on a small display is allocated for presentation of various types of user information is provided. The arrangement optimizes utilization of space on small displays by dynamically allocating lines on the display for presentation of status or header-type information as well as menu item-type information. The arrangement configures the display such that lines therein are dedicatable in any combination to displaying these two types of information.

21 Claims, 3 Drawing Sheets

ARRANGEMENT FOR DYNAMIC ALLOCATION OF SPACE ON A SMALL DISPLAY OF A TELEPHONE TERMINAL

This application is a continuation of application Ser. No. 08/775,316, filed Dec. 31, 1996.

BACKGROUND OF THE INVENTION

1. Technical Field

This invention is directed to telephone terminals and, more particularly, a telephone terminal configurable for accessing features available on the terminal through an interactive display arrangement.

2. Description of the Prior Art

With the advent of numerous features now available at many telephone terminals, displays having selectable menu options are being commonly employed to aid users in accessing the features associated with these options. The display technology employed in most telephone displays today is character-based liquid crystal device (LCD) displays. These displays are configured in various array sizes such as, for example, a 2-line by 10-character LCD display, a 3-line by 12-character LCD display and a 4-line by 12-character LCD display. In order to be aesthetically pleasing when incorporated into a telephone housing, these displays tend to be small, typically on the order of one inch in height. Also, in order to provide a reasonable number of characters for information such as caller-ID information and directory access information, a small font size for the characters is generally used. Thus, the numerous available features unfortunately require large amounts of information to be presented on very small displays.

For optimizing the utilization of space on small displays, some telephone terminals use soft key user interfaces. While soft key approaches can increase the flexibility of managing access to numerous features, they require that a portion of the display be dedicated exclusively to this purpose. For example, many telephone terminals dedicate the bottom row of the display for presentation of label screen prompts which correspond to a set of hard keys. Although these screen prompts do improve somewhat the ease with which one uses the display, such a design constrains the amount of space available for presentation of non-menu items, and also constrains the number of soft key choices which may be shown at any given time. Further, existing terminal screen designs typically constrain the maximum number of characters available for menu labels.

SUMMARY OF THE INVENTION

The prior art problems are solved in accordance with the present invention which provides an arrangement for dynamically varying how space on a small display is allocated for presentation of various types of user information. This arrangement is more flexible in organizing and presenting information than existing arrangements.

In accordance with an aspect of the invention, the arrangement optimizes utilization of space on small displays by dynamically allocating lines on the display for presentation of status or header-type information as well as menu item-type information. The arrangement configures the display such that lines therein are dedicatable in any combination to displaying these two types of information. By way of example, on a terminal with a 4-line display, one line may be dedicated to status information, and three lines to menu items; or alternatively, two lines may be dedicated to status information and two lines also to menu items. Thus, enhanced flexibility and efficiency are provided through use of this arrangement.

This invention and its mode of operation will be more clearly understood from the following detailed description when read with the appended drawings:

BRIEF DESCRIPTION OF THE DRAWINGS

Throughout the drawing, the same elements when shown in more than one figure are designated by the same reference numerals.

DETAILED DESCRIPTION

Figure 1:
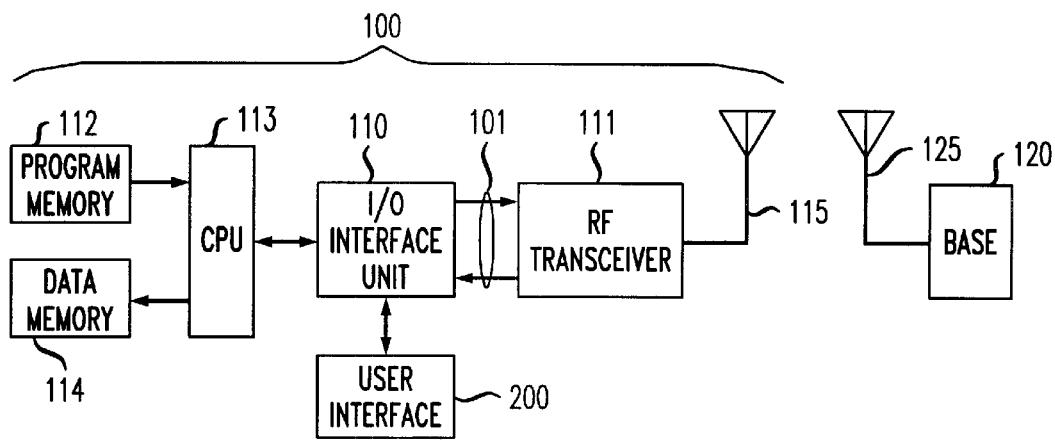
FIG. 1 is a block diagram of a wireless telephone terminal and a base unit, the telephone terminal being usable for incorporating the present invention.

Referring now to FIG. 1, there is shown an illustrative block diagram of a wireless telephone terminal 100 useful for describing the operation of the present invention. The terminal includes an input/output (I/O) interface unit 110 which connects to a radio frequency (RF) transceiver 111 containing a transmitter and receiver for providing communications in, by way of illustrative example, a cellular radio system.

Various types of cellular radio systems are known in the art and have been otherwise described. Once such system is described in *The Bell System Technical Journal,* Volume 58, January 1979, Number 1, particularly in papers entitled "Advanced Mobile Phone Service: Introduction, Background and Objectives" by W. R. Young and "The Cellular Concept" by V. H. MacDonald.

The RF transceiver 111 may also provide communications suitable for operating in a cordless telephone system. Such a cordless telephone system is described in U.S. Pat. Nos. 4,706,274 and 5,044,010, for example.

This I/O interface unit 110 contains switching and control circuits required by the terminal 100 for establishing, maintaining and terminating RF communications connections between terminal 100 and base unit 120. Through these circuits and via antennas 115 and 125, the terminal 100 thus sends to and receives the appropriate signals from the base unit via the RF transceiver 111.

The terminal 100 also includes a program memory 112 which provides instructions to a central processor unit (CPU) 113 for controlling the various operating features and functions originating at the terminal. This program memory 112 contains data for interpreting a plurality of codes representative of various control signals received from the base unit 120 and for generating codes to be transmitted to the base unit 120. A data memory 114 is utilized by the CPU 113 for storing and accessing data associated with performing the various functions and features programmed in the program memory 112. In the described embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
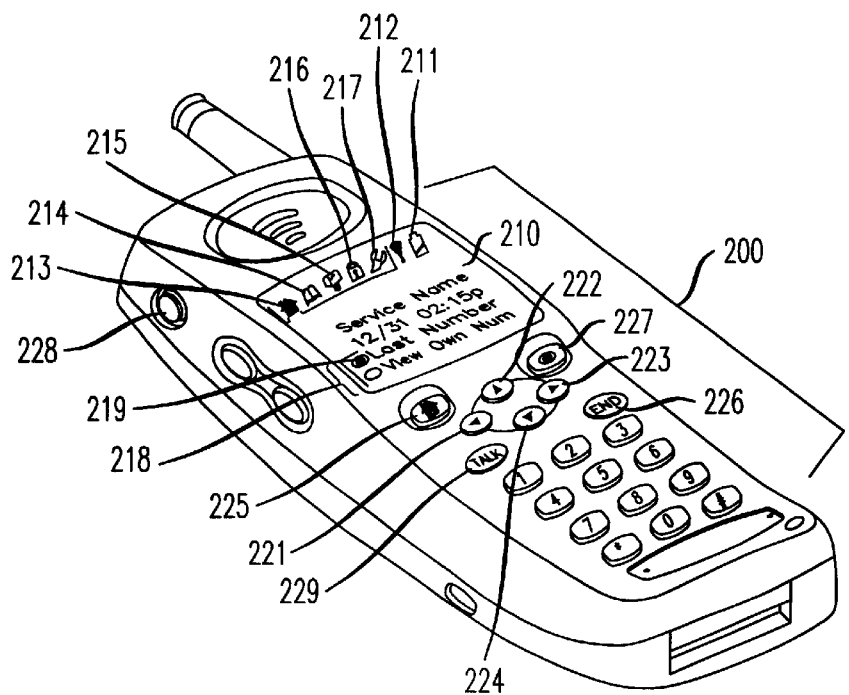
FIG. 2 illustrates the telephone terminal of FIG. I including a user interactive display displaying a first menu screen accessible in accordance with the present invention.

With reference now to FIG. 2, the user interface 200 comprises a user interactive display 210 which includes a number of Icon screen display symbols. Such screen display symbols include a battery level symbol 211, a signal strength symbol 212, a Home symbol 213, a Phone Book symbol 214, a Mailbox symbol 215, a Lock symbol 216 and a Tools symbol 217.

The battery level symbol 211 consists of four battery icons or symbols for showing the battery power level. At full charge, all symbols are filled-in. As the battery loses power, the filled-in part of each one of the symbols is removed from top to bottom leaving only the symbol outline. When only one filled-in symbol remains, it is an indication to the user to recharge the battery. The signal strength symbol 212 provides an indication of the received signal strength. The radiating portion of this symbol appears largest when the received signal is strong and becomes smaller as the received signal becomes weaker.

Also shown in the user interface 200 is a set of menu keys or buttons which provides, in accordance with the disclosed embodiment, quick access to all of the features of the telephone terminal with just a few key presses of these menu keys. The menu keys include a "Left" arrow key 221, a "Up" key 222, a "Right" arrow key 223, a "Down" arrow key 224, a "Home" key 225 and a "Select" key 227 which are functionally descriptive in moving between menu screens. These directional keys provide a dual axis of control for a user in navigating among a plurality of these menu screens. The Select key 227 selects the feature which is being displayed along the side of the filled-in oval outline. The Home key 225 is used to return a user to the original starting screen in the plurality of display screens. Other well-known keys or buttons: a "Talk" or send key 229, an "End" key 226 and a "Power" key 228, as well as others illustrated in the form of a dial pad, are also part of the telephone terminal shown in FIG. 2 but are conventional keys and need not be described in detail herein, except to indicate that, in a cellular system, the Talk key 229 and the End key 226 are used to respectively send a just-entered or stored telephone number to a base unit and to terminate an established conversation.

The screen display changes dynamically as the user performs functions and makes selections via the Select key 227. Shown in the display 210 is just one menu screen in the hierarchically arranged menu. The illustrated entry is one of possible original starting screens or the "Home Screen" which is conveniently provided for a user whenever the telephone terminal is turned ON from an OFF state or returned to its standby state after the user presses the End key 226, terminating a telephone call.

The Icon Home symbol 213, the Icon Phone Book symbol 214, the Icon Mailbox symbol 215, the Icon Lock symbol 216 and the Icon Tools symbol 216 are associated with parent menu screens which are at the top level in the hierarchical display. When the wireless terminal is turned on with the power key 228, the Home symbol 213 and its two selectable features from this level are provided in the Home Screen display or display 210. Also shown in this display is the name of the service provider that provides the user with cellular service and, optionally, time and date information.

The Phone Book symbol 214 is associated with a parent screen display for sub-menu displays in which telephone numbers are added or deleted, viewed or retrieved as appropriate by a terminal user. The Mailbox symbol 215 is associated with a parent screen display for sub-menu displays in which voice messages, test messages and call logs (incoming and outgoing) are accessed. The Lock symbol 216 is associated with a parent screen display for sub-menu displays through which security is provided for the terminal device. Display screens such as Phone Locks, Call Blocks, Phone Book Access and Mailbox access are accessed from this parent screen. The Tools symbol 217 is associated with a parent screen display for sub-menu displays through phone settings, call options and service options which are set by a user or representative of the service provider, as appropriate.

A user easily and intuitively advances among the parent menu screens by using the Right and Left arrow keys 223 and 225. As the user cycles among these screens, the Icon screen display symbol that is associated with the selected parent screen is filled-in or darkened thereby informing the user just which one of the top menu options is active. From either of the parent menu screens at the top level in the hierarchical display, the Down arrow key 224 moves down through the selectable sub-level menu choices and cycles at the bottom, back to the first entry of the sub-level menu choices. In order to access one of the sub-level menu choices, the user must select into the desired sublevel menu choice, with the Select key 227. While in a sub-level menu choice, should the user desire to move directly up in this menu choice, the Up arrow key 222 is used to take the user up through this choice and back to the parent screen. The simplicity of the user interface is that all features illustrated by the display screens herein are accessible through the use of the directional keys and the select key. Although all are not shown, each one of the equal level menu choices represented by menu screen displays 210, 320, 330, 340 and 350 provide a number of selectable optional screens that may be selected by the user of the telephone terminal 100.

The user interactive display 210 also includes a menu level indicator 218. This menu level indicator includes both upper and lower brackets and also a plurality of symbols comprising elliptical or oval shaped outlines enclosed in the brackets and aligned in a column on a side of the screen display. Selective use of the brackets advantageously provide an indication to the user that all selectable choices are available on the displayed screen or that one or more selectable choices are not shown on the displayed screen. Specifically, an open or missing bracket at the bottom of the menu level indicator 218 provides an indication to the user that there are additional choices off-screen and that the user may scroll down to these choices with the Down arrow key 224. An example of the menu level indicator with an open bracket at the bottom is shown in the display screen 210. An open or missing bracket at the top of the menu level indicator 218 provides an indication to the user that there are additional choices off-screen and that the user may scroll up to these choices with the Up arrow key 222. A closed bracket indicates that the display screen includes all of the selectable choices.

The Menu options or selectable features accessible for display and other information, to be described later herein, are provided by the filled-in oval shaped outline. When selectable menu options are being displayed on the menu screen, only one oval shaped outline is filled in for indicating to the user the one option that will then be selected when the Select key 227 is pressed. The level indicator 218 thus informs a user just which one of the menu options is currently active and may be selected by the dark or filled-in oval shaped outline next to a menu screen option. As shown in screen display 210, for example, a user may select the last number dialed by depressing the Select key 227 since the filled in oval 219 is adjacent to the "Last Number" screen display option. A user may also advance to the "View Own Num" screen display option by depressing first the Down arrow key 224 and then the Select key 227. Once the user of the telephone terminal has decided which menu choice he or she wishes to explore, the directional arrow keys 221, 222, 223 and 224 are used to place the darkened oval next to that choice on the display and the Select key 227 is then pressed to select that menu choice.

While the embodiment of the present invention is illustratively described as incorporated into a wireless telephone terminal, it should be recognized that the present command-operated terminal could be utilized in other program-controlled systems such as wired telephone terminals. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in FIG. 1; the display screen shown in FIGS. 2; and the display screen flow diagrams of FIGS. 3 and 4 which, taken together, describe the logical steps and the various parameters required to implement the present invention.

Figure 3:
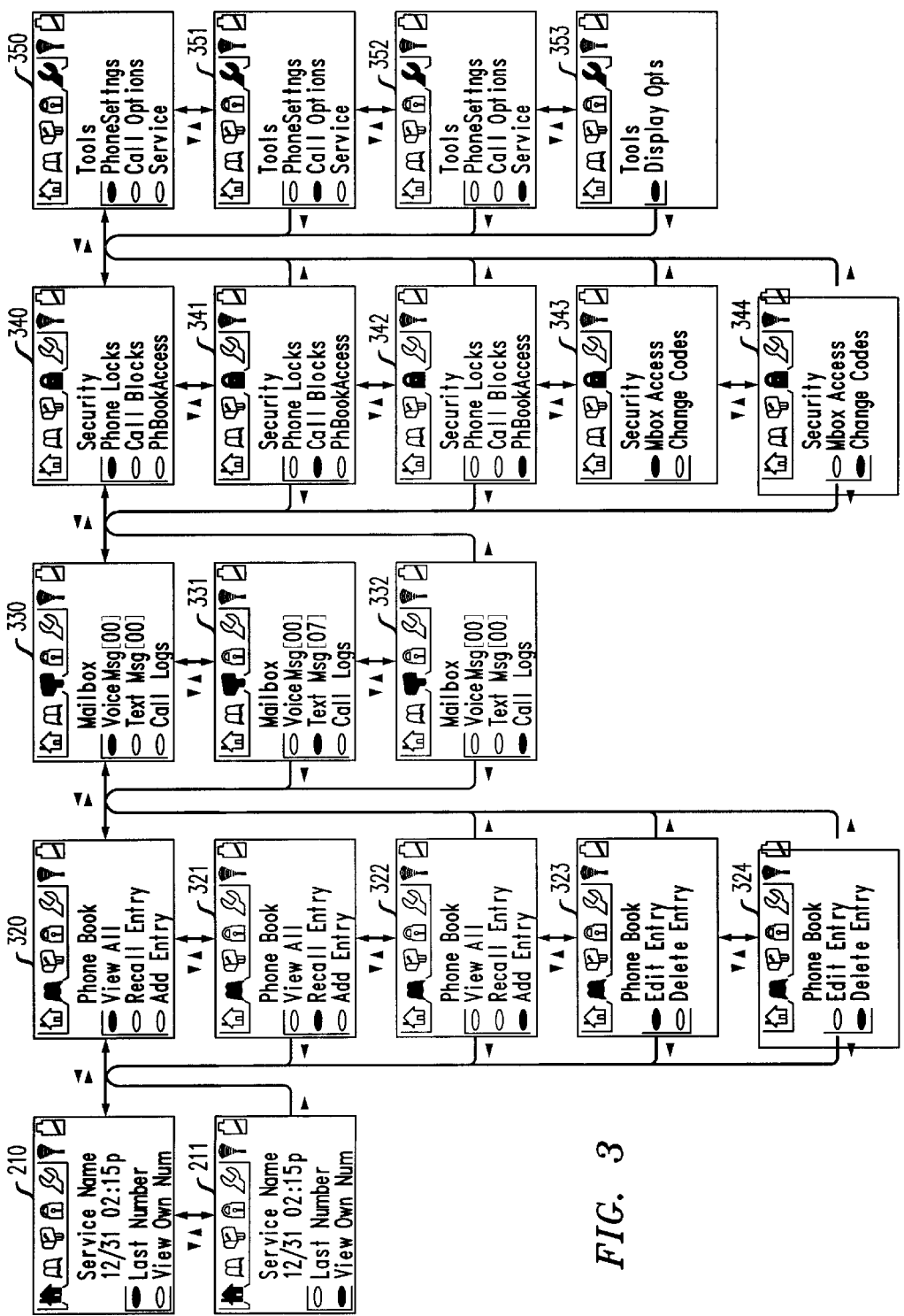
FIGS. 3 and 4 are flow charts illustrating some of the display screens provided by the circuitry shown in FIG. 1 and produced in an interactive display shown in FIG. 2 in accordance with the invention.
Figure 4:
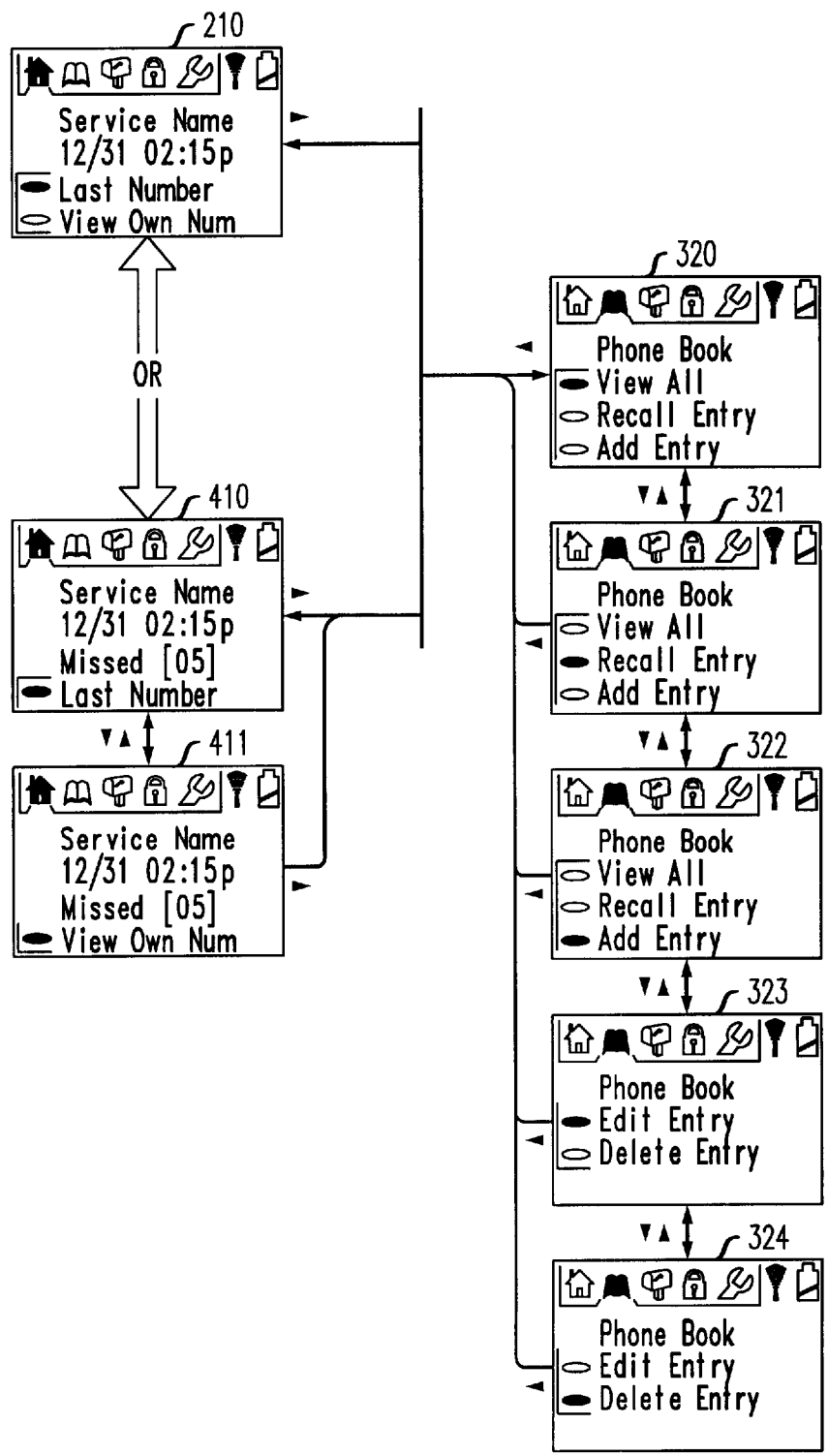

FIG. 3 shows a flow chart for illustrating some of the display screens provided by the circuitry in FIG. I and produced in the interactive display in the same manner as illustratively shown in display 210 in FIG. 2. These display screens, along with those shown in FIG. 4, are illustratively embodied in a 4-line by 12 character LCD display. The sequence in which these display screens are provided is indicated by the flow chart, and is shown in sufficient detail to permit one skilled in the art to duplicate the circuitry of FIG. 1, either by programming a microprocessor or by special purpose logic circuitry such as is available in a digital signal processor.

The display screens shown in FIG. 3 are of the five parent screens 210, 320, 330, 340 and 350 or main areas on the top level of the menu. For general navigation on this top level of the menu, the user uses the Right or Left arrow keys 223 or 221 to move across the five main areas of the display, which are, the Home screen, where manual calls are placed, the Phone Book, Mail Box, Lock, and Tools.

For ease of understanding the flow charts shown in both FIGS. 3 and 4 and movement between the display screens shown therein, filled-in or darkened directional triangles, which respectively represent the four directional arrow keys, are employed. Thus, by way of example, movement between the display screen 210 and display screen 320 may be accomplished by pressing the right arrow key 223, which also has an image of a right-facing triangle located thereon. Similarly, movement between the display screen 320 and display screen 210 may be accomplished by pressing the left arrow key 225, which also has an image of a left-facing triangle located thereon. Movement between display screen 320 and display screen 321 is achieved in a similar manner, only using up-facing and down-facing triangles which respectively correspond to the up arrow key 222 and the down arrow key 224. For further ease of understanding, these directional triangles are positioned near interconnecting lines that extend to those display screens between which the user is able to navigate.

When navigation between screens requires that the user press the Select key 227, a filled-in elliptical or oval shaped outline is positioned near the interconnecting line that requires this key press. Thus, for example, to move from menu screen 331 to menu screen 401 requires pressing the Select key 227. And this filled in oval shaped outline is conveniently provided on the top surface of the Select Key 227.

With reference now to navigating in the parent screens, and starting from the Home display screen 210, the user can press the Right arrow key 223, for example, to move across to the Phone Book screen 320 and see the first three selectable features of the Phone Book. Here the Up and Down arrow keys 222 and 224 can be used to move the darkened elliptical cursor to any of the Phone Book features as shown in screens 320 through 323 and the Select key 227 can then be used to choose a feature. The Right arrow key 223 again allows movement to the next area of the interface, the Mail Box screen 330 where the three features of the Mailbox screen can be viewed and accessed. Another press of the Right arrow key moves the user to the Locks screen 340 where features shown in screens 340 through 344 are accessed. Yet another press of the Right arrow key moves the user to the Tools screen 350 where features shown in the screens 350 through 353 are accessed. One last press of the Right arrow key moves the user to the home screen 210 once again. As the user moves to each of the parent screens, the outline of the Icon associated with that parent screen is darkened. Thus the user always knows which main area is being accessed.

Referring next to FIG. 4, there is shown, in accordance with the disclosed embodiment, a flow chart which illustrates how the allocation of space on a small display may be dynamically varied for presentation of various types of user information. Either Home screen 210 or Home screen 410, which shows an alternative initialization screen, is presented to the user when the user powers-up the telephone terminal. As illustrated in Home screen 210, the first or upper two lines of the display are used to present status information to the user. The uppermost line identifies the service provider and the second line from the top displays date and time status information. Also, on this screen, the third and fourth lines of the display are used to present selectable menu choices or item type information to the user. The user may press the Select key 227 to activate one of these options when the darkened oval is positioned next to the desired option. By way of example, in screen 210, pressing the Select key 227 redials the last number previously dialed.

The alternative Home screen 410 provides an indication to a user that missed calls have been attempted to the telephone terminal. Missed calls are those wherein a caller has attempted to place a call to the telephone terminal, but for some reason, typically that the telephone was turned off, the call was not completed. So that a user is informed of these one or more missed calls, a status indication indicative of these missed calls is presented to the user on the third line of the display as shown in screen 410. To accommodate this additional status information line appearing in the display, the selectable menu items, i.e., "Last Number" and "View Own Num," are shifted down in the display. One consequence of this is one or more selectable menu items may no longer appear on the display but rather have to be cycled to using the Down arrow key. Thus if the user wished to view his or her own number, the Down key 224 must be pressed to generate screen 411 where the user's number may be selected.

In achieving this advantageous operation, the terminal includes suitable coding for assigning a priority to either the status or header-type information or to the menu type-item information. In response to this priority coding which is assigned for each of the display screens, the desired information is suitably displayed in each of the display screens. The advantage of this arrangement is that it provides a very flexible manner in organizing and presenting information.

If the user presses the Right arrow key when viewing the Home screen 210, or the alternative Home screen 410 (and also screen 411), the Phone Book menu screen 320 will be displayed. In this screen, the top line is dedicated to status information which is, in this case, the title of the menu. The last three lines of the display are dedicated to selectable menu choices. As the user presses the Down arrow key to step through the menu choices, when he or she arrives at the bottom of the menu the user may view one or two blank lines after the last menu choice. By way of illustrative example, in this Phone Book parent menu screen there are five selectable menu choices, three being shown in the first three screens, 320 through 322, and the last two being shown in screens 323 and 324. Thus, the user is readily made aware by the appearance of both the blank line or lines appearing after the last menu choice that all of the possible selectable choices in a downward direction have been accessed. Such blank line or lines supplement the information provided to the user by the brackets (earlier described herein) also provided to the user in these displays.

What has been described is merely illustrative of the present invention. Other applications to telephone, computer or other user-interactive systems other than the disclosed system are contemplated as being within the knowledge of one skilled in the art. Thus it is to be understood that the disclosed user interface may be utilized in displays and applications, other than those specifically described herein, without departing from the spirit and scope of the present invention.

We claim:

1. An arrangement for configuring a telephone terminal for displaying selectable information at the terminal, the arrangement comprising:
    means for providing a first type of information comprising status or header type information available for display at a predetermined position in each one of a plurality of selectable display screens in the telephone terminal;
    means for providing a second type of information comprising menu type information available for display at said predetermined position in each one of said plurality of selectable display screens in the telephone terminal; and
    means for assigning a priority to said first or said second type of information for displaying in said predetermined position, said priority being determined by a selected one of said selectable display screens in which said information is displayed.

2. The arrangement of claim 1 wherein the first type of information is status type information.

3. The arrangement of claim 2 wherein the second type of information is menu-item type information.

4. The arrangement of claim 1 wherein said information type without said assigned priority is assigned to a second predetermined position for display in said selected one of said selectable screens.

5. The arrangement of claim 4 wherein each of said display screens comprise a 4-line display.

6. The arrangement of claim 5 wherein responsive to said assigning means one of said four lines in said 4-line display is configured with said first type of information and three of said four lines in said display are configured with said second type of information.

7. The arrangement of claim 5 wherein responsive to said assigning means two of said four lines in said 4-line display are configured with said first type of information and two of said four lines in said display are configured with said second type of information.

8. The arrangement of claim 5 wherein responsive to said assigning means three of said four lines in said 4-line display are configured with said first type of information and one of said four lines in said display is configured with said second type of information.

9. The arrangement of claim 8 wherein the first type of information is status type information.

10. The arrangement of claim 9 wherein the second type of information is menu-item type information.

11. A method of configuring a telephone terminal for displaying selectable information at the terminal, the method comprising the steps of:
    providing a first type of information comprising status or header type information available for display at a predetermined position in each one of a plurality of selectable display screens in the telephone terminal;
    providing a second type of information comprising menu type information available for display at said predetermined position in each one of said plurality of selectable display screens in the telephone terminal; and
    assigning a priority to said first or said second type of information for displaying in said predetermined position, said priority being determined by a selected one of said selectable display screens in which said information is displayed.

12. The method of claim 11 wherein said information type without said assigned priority is assigned to a second predetermined position for display in said selected one of said selectable screens.

13. The method of claim 12 wherein each of said display screens comprise a 4-line display.

14. The method of claim 13 wherein responsive to said assigning step one of said four lines in said 4-line display is configured with said first type of information and three of said four lines in said display are configured with said second type of information.

15. The method of claim 14 wherein responsive to said assigning means two of said four lines in said 4-line display are configured with said first type of information and two of said four lines in said display are configured with said second type of information.

16. The method of claim 15 wherein responsive to said assigning means three of said four lines in said 4-line display are configured with said first type of information and one of said four lines in said display is configured with said second type of information.

17. The method of claim 16 wherein the first type of information is status type information.

18. The method of claim 17 wherein the second type of information is menu-item type information.

19. An arrangement for configuring a telephone terminal for displaying selectable information at the terminal, the arrangement comprising:
    means for providing a first type of information comprising status or header type information available for display at a predetermined position in each one of a plurality of selectable display screens in the telephone terminal;
    means for assigning a priority to said first or said second type of information for displaying in said predetermined position, said priority being determined by a selected one of said selectable display screens in which said information is displayed; and means for dynamically varying how space is allocated on the display for said first and second information to provide a flexible manner of organizing and presenting said first and second information.

20. A method of configuring a telephone terminal for displaying selectable information at the terminal, the method comprising the steps of:

providing a first type of information comprising status or header type information available for display at a predetermined position in each one of a plurality of selectable display screens in the telephone terminal;

providing a second type of information comprising menu type information available for display at said predetermined position in each one of said plurality of selectable display screens in the telephone terminal;

assigning a priority to said first or said second type of information for displaying in said predetermined position, said priority being determined by a selected one of said selectable display screens in which said information is displayed; and dynamically varying how space is allocated on the display for said first and second information to provide a flexible manner of organizing and presenting said first and second information.

21. An interactive display arrangement for dynamically varying how lines on a small display are allocated and configuring a telephone terminal for displaying selectable information at the terminal, the arrangement comprising:

means for providing a first type of information comprising status or header type information available for display at a predetermined position in each one of a plurality of selectable display screens in the telephone terminal;

means for providing a second type of information comprising menu type information available for display at said predetermined position in each one of said plurality of selectable display screens in the telephone terminal;

means for assigning a priority to said first or said second type of information displaying in said predetermined position, said priority being determined by a selected one of said selectable display screens in which said information is displayed; and means for dynamically allocating one or more lines of said small display between the first and second types of information.

\* \* \* \* \*